(12) United States Patent
Puff

(10) Patent No.: US 6,638,035 B1
(45) Date of Patent: Oct. 28, 2003

(54) RESONANT ASSEMBLY FOR A RECIPROCATING COMPRESSOR WITH A LINEAR MOTOR

(75) Inventor: Rinaldo Puff, Joinville-SC (BR)

(73) Assignee: Empresa Brasileira de Compressores S.A. - EMBRACO, Joinville-SC (BR)

( * ) Notice: Subject to any disclaimer, the term of this patent is extended or adjusted under 35 U.S.C. 154(b) by 0 days.

(21) Appl. No.: 10/070,913

(22) PCT Filed: Sep. 6, 2000

(86) PCT No.: PCT/BR00/00101
§ 371 (c)(1),
(2), (4) Date: Jun. 24, 2002

(87) PCT Pub. No.: WO01/18393
PCT Pub. Date: Mar. 15, 2001

(30) Foreign Application Priority Data

Sep. 9, 1999 (BR) ............................................. 9904532

(51) Int. Cl.[7] ............................ F04B 17/04; F04B 17/00
(52) U.S. Cl. ...................... 417/417; 417/415; 417/416; 92/130 C
(58) Field of Search ................... 417/415, 417, 417/470, 416; 92/130 C, 130 R

(56) References Cited

U.S. PATENT DOCUMENTS

| | | | | |
|---|---|---|---|---|
| 1,640,742 A | * | 8/1927 | Wallace et al. | 310/34 |
| 1,996,160 A | * | 4/1935 | Konig | 417/416 |
| 5,066,204 A | * | 11/1991 | Point et al. | 417/413.1 |
| 5,468,082 A | * | 11/1995 | Hori | 401/4 |
| 5,496,153 A |   | 3/1996 | Redlich | 417/212 |
| 5,525,845 A |   | 6/1996 | Beale et al. | 310/30 |

FOREIGN PATENT DOCUMENTS

| | | | |
|---|---|---|---|
| DE | 729798 | 11/1942 | |
| JP | 10332214 | 12/1998 | ............. F25B/9/14 |
| WO | WO 02/090773 A1 | * 11/2002 | ........... F04B/35/04 |

* cited by examiner

Primary Examiner—Charles G. Freay
Assistant Examiner—Timothy P. Solak
(74) Attorney, Agent, or Firm—Darby & Darby

(57) ABSTRACT

A resonant assembly for a reciprocating compressor driven by a linear motor. The compressor includes a piston (2), driven by an actuator (3), which reciprocates inside a cylinder (1a) provided with an end closed by a head. The assembly comprises a resonant element, defining by a single piece, a rod portion (11) and a spring portion (12). The spring portion is affixed to a non-resonant structure (1) of the compressor at a plurality of points which are symmetric in relation to the longitudinal axis of the cylinder and lie on a plane orthogonal to the longitudinal axis of the cylinder.

5 Claims, 1 Drawing Sheet

RESONANT ASSEMBLY FOR A RECIPROCATING COMPRESSOR WITH A LINEAR MOTOR

FIELD OF THE INVENTION

The present invention refers to a resonant device for a reciprocating compressor driven by a linear motor and to be applied to refrigeration systems of the type used in small refrigeration appliances, such as refrigerators, freezers, drinking fountains, etc.

BACKGROUND OF THE INVENTION

In the reciprocating compressors with a linear motor, the reciprocating movement of a piston inside a cylinder is effected by means of an actuator, which supports a magnetic component activated by the linear motor. The piston is connected, by means of a usually flexible connecting rod, to a resonant spring, forming with the latter and with the magnetic component, the resonant assembly of the compressor.

The non-resonant assembly of the compressor is formed by a structure lodging the cylinder, the suction and discharge systems of the compressor and its linear motor.

The resonant assembly has the function of developing a reciprocating linear movement in relation to the non-resonant assembly, making the movement of the piston inside the cylinder exert a compressive action on the gas admitted in the compressor, by suction, up to the point in which this gas may be discharged to the high pressure side of the refrigeration system to which the compressor is mounted.

The aim of connecting the piston to the resonant spring by means of a flexible connecting rod is to minimize the transmission of moments of the piston resulting from alignment errors between the center of the resonant spring and the center of the cylinder.

The transmission of said moments resulting from alignment errors make the piston assume an inclined position in relation to the center line of the cylinder, allowing the occurrence of metallic contact between these two components, causing wear and noise due to the attrition created.

The known prior art solutions present a flat resonant spring, of simple construction (FIG. 1), or defined in multiple parallel layers (U.S. Pat. No. 5,525,845), which operates with a long flexible connecting rod of small diameter. These resonant springs, together with the flexible connecting rod, form an assembly difficulty to manufacture and normally high in cost.

DISCLOSURE OF THE INVENTION

Thus, it is an object of the present invention to provide a resonant device for a reciprocating compressor with a linear motor, of reduced cost and easy construction, which minimizes the problems presented by the known prior art constructions.

These and other objectives are achieved by a resonant assembly for a reciprocating compressor with a linear motor, having a piston driven by an actuator, in order to reciprocate inside a cylinder of a non-resonant structure, said cylinder being provided with an end closed by a head, said resonant assembly comprising a resonant element defining, in a single piece, a rod portion, which is flexible and elongated and has a first end coupled to the piston and a second end incorporated to a spring portion affixed to the nonresonant structure according to a plurality of points, which are symmetric in relation to the longitudinal axis of the cylinder and lying on a fixation plane orthogonal to said longitudinal axis of the cylinder.

BRIEF DESCRIPTION OF THE DRAWING

The invention will be described below, with reference to the attached drawings, in which.

BEST MODE OF CARRYING OUT THE INVENTION

The present invention will be described in relation to a reciprocating compressor driven by a linear motor which connects the compressor to, for example, a refrigeration system.

Figure 1:
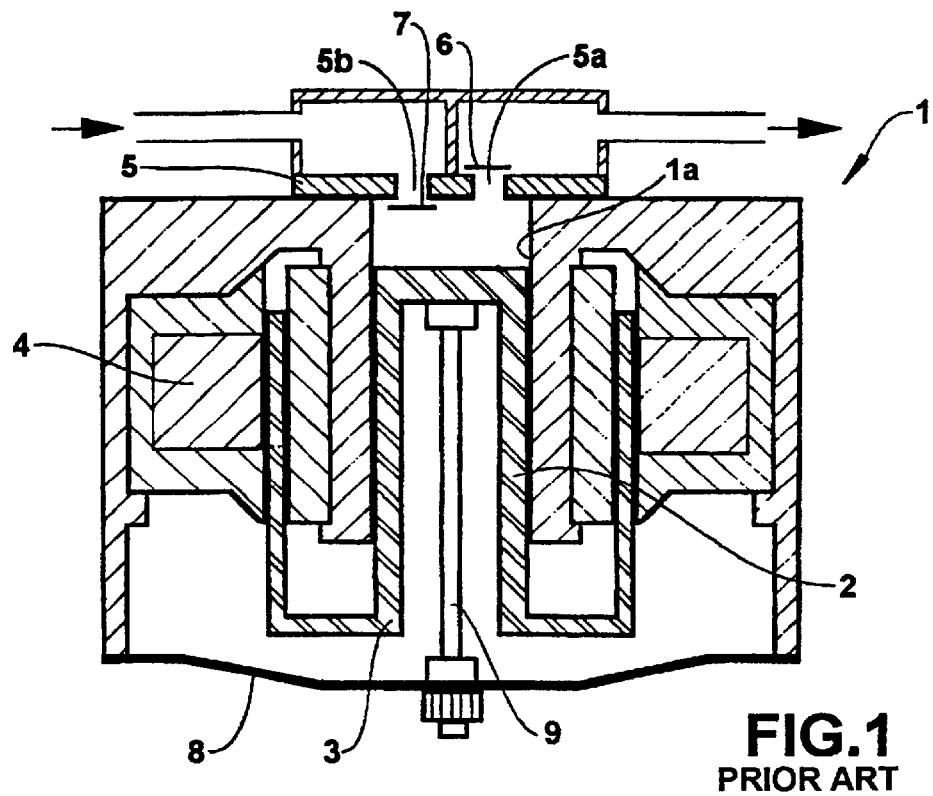
FIG. 1 illustrates, schematically, a diametral longitudinal sectional view of part of a reciprocating compressor with a linear motor constructed according to the prior art.

In the illustrated prior art construction, the compressor has a non-resonant structure 1, including a cylinder 1a, inside which is provided a piston 2 coupled to an actuator 3, usually tubular and external to the cylinder 1a and provided with a magnet 4, which is axially impelled by energization of the electric motor (FIG. 1).

In this prior art construction, the separation and approximation movements of the piston 2 inside the cylinder 1a in relation to a head 5 mounted to an end of the cylinder 1a determines, respectively, the suction and compression operations of the gas in the compressor.

In the head 5 is provided a suction orifice 5a, wherein, is mounted a suction valve 6, and a discharge orifice 5b, wherein is mounted the discharge valve 7, which valves regulate the gas admission and the gas exit in the cylinder 1a.

Piston 2 is connected to a resonant spring 8, by means of a connecting rod 9, forming with the latter, with the actuator 3 and with the magnet 4 a resonant assembly.

According to the present invention, the resonant assembly comprises a resonant element 10 which defines, in a single piece, a rod portion 11, which is long and flexible, and a spring portion 12, the rod portion 11 having a first end 13 coupled to the piston 2 and a second end 14 incorporated to the spring portion 12, through a first end thereof.

The spring portion 12 is affixed to the non-resonant structure 1 by an adequate fixation means, according to a plurality of points which are symmetrical in relation to the longitudinal axis of the cylinder 1a and lying on a fixation plane orthogonal to the cylinder 1a.

According to the present invention, the rod portion 11 is axially affixed inside the piston 2 and has its second end 14 projecting beyond the plane where the spring portion 12 is affixed to the non-resonant structure 1, and extending through the inside of the spring portion 12.

Figure 2:
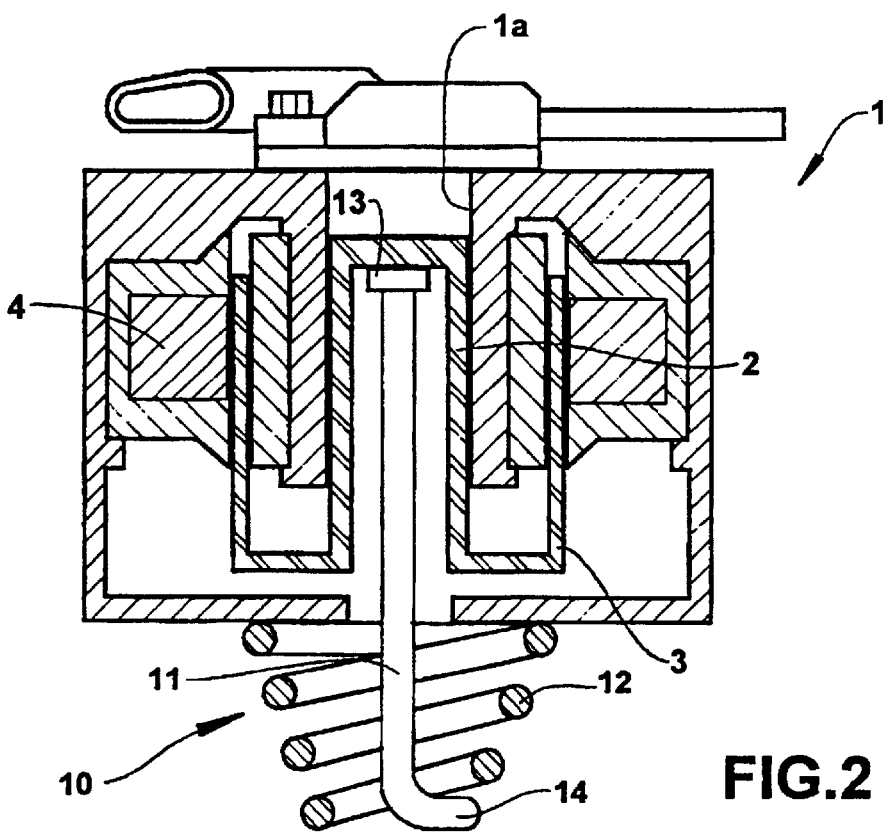
FIG. 2 illustrates, schematically, a diametral longitudinal sectional view of part of a reciprocating compressor with a linear motor constructed according to a way of carrying out the present invention.

According to the illustration of FIG. 2, the spring portion 12 is a helical spring having coils with increasing radii from the first end thereof. With this construction, it is possible to obtain a resonant assembly with few parts, of reduced cost and which minimizes the transmission of disalignment moments to the piston 2.

What is claimed is:

1. A resonant assembly for a reciprocating compressor with a linear motor, having a piston (2) driven by an actuator (3), in order to reciprocate inside a cylinder (1a) of a non-resonant structure (1), said cylinder (1a) being provided with an end closed by a head (5), characterized in that it comprises a resonant element (10) defining, in a single piece, a rod portion (11), which is flexible and elongated and has a first end (13) coupled to the piston (2) and a second end (14) incorporated to a spring portion (12) affixed to the non-resonant structure (1) according to a plurality of points which are symmetric in relation to the longitudinal axis of the cylinder (1a) and lying on a fixation plane orthogonal to said longitudinal axis of the cylinder (1a).

2. The assembly of claim 1, characterized in that the second end (14) of the rod portion (11) projects beyond the plane where the spring portion (12) is affixed to the non-resonant structure (1).

3. The assembly of claim 2, characterized in that the spring portion (12) is a helical spring.

4. The assembly of claim 3, characterized in that the spring portion (12) is formed by coils with increasing radii from the first end thereof.

5. The assembly of claim 3, wherein the actuator (3) is tubular and characterized in that the rod portion (11) is axially affixed inside the piston (2) and extends through the inside of the spring portion (12).

* * * * *